United States Patent [19]
Rosenbaum et al.

[11] Patent Number: 6,111,007
[45] Date of Patent: Aug. 29, 2000

[54] PROCESS FOR FORMING FUNCTIONALIZED EPM OR EPDM LATEX COMPOSITION

[75] Inventors: Barry M. Rosenbaum, Shaker Heights, Ohio; Edward N. Kresge, Watchung, N.J.; Russell A. Livigni, Akron, Ohio

[73] Assignee: OMNOVA Solutions Inc., Fairlawn, Ohio

[21] Appl. No.: 09/076,943

[22] Filed: May 13, 1998

[51] Int. Cl.$^7$ .............................. C08K 3/20; C08L 61/00
[52] U.S. Cl. .......................... 524/461; 524/542; 524/547; 524/570; 524/571
[58] Field of Search .................... 524/461, 542, 524/547, 570, 571

[56] References Cited

U.S. PATENT DOCUMENTS

| | | |
|---|---|---|
| Re. 31,680 | 9/1984 | Caywood, Jr. ............................ 525/285 |
| 3,673,142 | 6/1972 | Saunders et al. . |
| 4,007,149 | 2/1977 | Burton et al. ............................ 260/29.7 |
| 4,010,223 | 3/1977 | Caywood, Jr. ............................ 260/875 |
| 4,077,933 | 3/1978 | Burton et al. . |
| 4,156,061 | 5/1979 | Pappas et al. ............................ 526/20 |
| 4,174,335 | 11/1979 | Ohdaira et al. ............................ 260/29.6 |
| 4,294,744 | 10/1981 | Klein et al. ............................ 260/33.6 |
| 4,340,689 | 7/1982 | Joffrion ............................ 525/263 |
| 4,410,655 | 10/1983 | Funakoshi et al. ............................ 524/522 |
| 4,423,185 | 12/1983 | Matsumoto et al. ............................ 525/66 |
| 4,460,749 | 7/1984 | Linder et al. ............................ 525/310 |
| 4,524,107 | 6/1985 | Marchetti et al. ............................ 428/413 |
| 4,775,713 | 10/1988 | Homma et al. ............................ 524/517 |
| 4,966,940 | 10/1990 | Tsuji et al. ............................ 525/66 |
| 4,970,258 | 11/1990 | Homma et al. ............................ 524/504 |
| 4,978,707 | 12/1990 | Tanaka et al. ............................ 524/504 |
| 5,003,003 | 3/1991 | Olivier ............................ 525/66 |
| 5,006,601 | 4/1991 | Lutz et al. ............................ 525/66 |
| 5,061,751 | 10/1991 | Patton ............................ 525/57 |
| 5,075,383 | 12/1991 | Migdal et al. ............................ 525/293 |
| 5,153,282 | 10/1992 | Datta et al. ............................ 526/75 |
| 5,180,777 | 1/1993 | Padwa et al. ............................ 525/66 |
| 5,216,075 | 6/1993 | Papazoglou ............................ 525/66 |
| 5,272,206 | 12/1993 | Moffett et al. ............................ 525/66 |
| 5,356,955 | 10/1994 | Dekkers et al. ............................ 523/201 |
| 5,384,371 | 1/1995 | Caines et al. ............................ 525/285 |
| 5,449,706 | 9/1995 | Iwase et al. ............................ 523/409 |
| 5,516,849 | 5/1996 | Caines et al. ............................ 525/285 |
| 5,525,668 | 6/1996 | Olivier ............................ 524/504 |
| 5,574,091 | 11/1996 | Walther et al. ............................ 524/570 |
| 5,637,410 | 6/1997 | Bonner et al. ............................ 428/516 |
| 5,670,575 | 9/1997 | Flexman, Jr. ............................ 525/66 |
| 5,798,410 | 8/1998 | Walther et al. ............................ 524/570 |

OTHER PUBLICATIONS

G. W. Burton and C.P. O'Farell, Exxon Chemical Company, Linden, NJ, Preparation of Artificial Latexes, J. Elastomers and Plastics, vol. 9 (Jan. 1, 1997), pp. 94–101, Pub. by Technomic Publishing Co., formerly in Westport, CT, now in Lancaster, PA.

*Primary Examiner*—Ana Woodward
*Attorney, Agent, or Firm*—Robert F. Rywalski; Daniel J. Hudak

[57] ABSTRACT

A process is described for preparing a functionalized EPM or EPDM artificial latex from the EPM or EPDM polymerization reactor without isolating the polymer. The process includes i) post polymerization functionalizing of an EPM or EPDM copolymer, ii) dispersing the functionalized copolymer in water with an appropriate surfactant and iii) removing the solvents. The resulting latex is useful in paper coatings, latex coatings, adhesives, and in impact modifiers.

12 Claims, No Drawings

PROCESS FOR FORMING FUNCTIONALIZED EPM OR EPDM LATEX COMPOSITION

FIELD OF INVENTION

Ethylene-propylene rubber (EPM) or ethylene-propylene diene rubber (EPDM) is functionalized directly after polymerization with hydroxyl, carboxyl, anhydride of carboxyl, pyrrolidone, or amine groups and then emulsified in water to form an artificial latex with average particle diameters from about 0.2 to 20 microns. The latexes are useful in many applications where conventional polybutadiene latexes or poly(styrene-butadiene) latexes were used and in some applications where the properties/behavior of the EP backbone are advantageous.

BACKGROUND OF THE INVENTION

Free radical emulsion polymerizations are used to form most synthetic latexes. While ethylene can be polymerized by free-radical mechanisms, ethylene-propylene copolymers cannot be commercially prepared by free radical polymerization. Instead ethylene-propylene (EPM) copolymers and ethylene-propylene-diene copolymers are made by a coordination polymerization solution method rather than free radical emulsion processes. Examples of coordination polymerization methods are Ziegler-Natta polymerization and metallocene polymerization.

Emulsions or dispersions of preformed polymers have been made by dissolving the bulk polymer in a solvent to reduce its viscosity and emulsifying it in water, often with the aid of a dispersant such as a surfactant. Thereafter, the solvent is removed. Such processes are described in Preparation of Artificial Latexes by G. W. Burton and C. P. O'Farrell in J. of Elastomers and Plastics, vol. 9, January 1977, pp 94–101. While such processes to dissolve a bulk polymer and emulsify it to form an artificial latex sound like a simple procedure, there are many impediments to forming artificial latexes with useful properties, including high processing costs.

Bulk EPDM polymer has been functionalized with a variety of monomers (such as maleic anhydride) and used in preparing various polymer blends. Bulk EPDM refers to EPDM polymer without solvents or water.

SUMMARY OF INVENTION

An important aspect of this invention is functionalizing the polymerization reaction product of a solution polymerization process while the reaction product is still in its polymerization solvent, i.e. without the polymer first being separated in bulk form from the solvent used for polymerization.

A rubbery ethylene (olefin) copolymer having from about 20 to about 85 wt. % repeat units from ethylene, from about 10 or 15 to about 80 wt. % of a copolymerizable monomer, desirably an alpha-olefin of 3 to 12 carbon atoms such as propylene or 1-butene, and optionally a polyene can be functionalized (post polymerization). The ethylene copolymer is desirably at least 85 or 90 weight percent repeat units from 2 or more alpha-monoolefins having from 2 to 8 carbon atoms. The resulting functionalized copolymer, desirably as a solution in a non-polar solvent optionally including unreacted monomers, can be dispersed in water containing a suitable surfactant to form a latex and thereafter the solvent and/or monomers are removed. This will result in a latex of a functionalized ethylene copolymer. Copolymer is used to define a polymer from two or more different monomers. Desirably the ethylene copolymer is an ethylene-propylene rubber EPM or ethylene-propylene-diene rubber (EPDM). Desirably the functional groups are selected from carboxyl, anhydride of two carboxyls, pyrrolidone, pyridine hydroxyl, sulfonic and amine. Desirably the amount of functional groups per 100 grams of functionalized ethylene copolymer is from about 0.005 to about 0.2 moles. Desirably the number average particle diameter of the latex is from about 0.2 micron to about 20 microns.

DETAILED DESCRIPTION

A functionalized ethylene copolymer dispersed as discrete particles in water is the desired product. The solids content of the latex (solids being defined as the weight percent of the latex which does not volatilize upon drying to constant weight at 105° C.) is desirably from about 10 or 20 to about 60 wt. %. The volatile portion of the latex is predominantly water, which is desirably present in amounts from about 40 to about 80 or 90 wt. % based upon the latex weight. The discrete particles of the latex desirably have a number average particle diameter from about 0.2 to about 20 microns. The particle diameter is determined after the solvent and optional residual monomers are predominantly removed from the dispersion of the ethylene copolymer. Predominantly removed is defined for the purpose of this specification as to less than 1 wt. % based upon the weight of the functionalized ethylene copolymer.

The ethylene copolymer need not be predominantly repeat units from ethylene, e.g. it could comprise a majority of another alpha-monoolefin such as propylene. Prior to functionalization it desirably comprises at least 85 wt. % repeat units from 2 or more alpha-monoolefins having from 2 to 8 carbon atoms. Desirably the copolymer prior to functionalization comprises from about 15 to about 85 wt. % repeat units from ethylene. Desirably the ethylene copolymer consists essentially of repeat units from ethylene and propylene (i.e. EPM rubber) or consists essentially of repeat units from ethylene, propylene and a diene (i.e. EPDM rubber). Desirably the copolymerizable monomer is an alpha-olefin having from 3 to 8 carbon atoms and preferably it is propylene or 1-butene. Optionally the ethylene copolymer can include a third or additional monomers. A preferred third monomer is a polyunsaturated hydrocarbon (polyene) which can provide residual unsaturation to the ethylene copolymer. The residual unsaturation can be used to crosslink the ethylene copolymer or to facilitate functionalization under less harsh conditions. Preferred polyunsaturated hydrocarbons are unsaturated olefins having from 5 to 20 carbon atoms such as 1,4 hexadiene and polyunsaturated cyclics having from 8 to 20 carbon atoms such as dicyclopentadiene, vinyl norbornene, methylene norbornene, and ethylidene norbornene. The weight percent repeat units from polyunsaturated hydrocarbons, when used is desirably from about 0 to about 15 wt. percent. The above weight percent are based upon the unfunctionalized ethylene copolymer.

Desirably the unfunctionalized ethylene copolymer is rubbery meaning it has a glass transition temperature below 0° C. and has less than 40 and more desirably less than 25 wt percent crystallinity as determined by x-ray crystallography.

Desirably the unfunctionalized ethylene copolymer has a molecular weight distribution such that the polydispersity index (PDI) or Mw/Mn is less than 5.5. The narrow molecular weight distribution (MWD) of the unmodified copolymer is important to the process. For a given Mn, the broader the MWD of the copolymer the higher the viscosity of the polymer in the polymerization solution and the solution of the modified polymer use to produce the emulsion. If the solution viscosity is too high emulsification and latex preparation requires excessive mixing or becomes otherwise difficult. The polymers may include long chain branches. These can be formed during polymerization by methods known in the art. Such long chain branching can be used to lower solution viscosity without decreasing molecular weight. In introducing long chain branching it is important to limit the production of gel. Gel is defined as polymer that is insoluble in the polymerization solvent (usually due to crosslinking several polymer chains together) and should be less than 3 wt. % of the polymer and desirably less than 1 wt. %. Higher gel contents typically lead to large particles in the final latex. Desirably the unfunctionalized ethylene copolymer has a number average molecular weight of above 5,000 and preferably above 8,000. Desirably the ethylene copolymer has less than 5 wt. % repeat units having atoms other than carbon and hydrogen such as repeat units having one or more oxygen atom or halogens such as chlorine or fluorine.

The unfunctionalized ethylene copolymer is functionalized after being formed by polymerization. This is often referred to as post-polymerization functionalization. It is highly preferred that the ethylene copolymer be functionalized and emulsified before the ethylene copolymer is entirely isolated from the polymerication solvent or otherwise recovered from its polymerization media. Functionalization is achieved by chemically bonding, for example by grafting, molecules having the desired functional groups to the EPM or EPDM polymer chains. A preferred way to cause the chemical bonding of the molecules having the desired functional groups is through the use of free radical initiators. The molecules having the desired functional groups typically have a carbon to carbon double bond that is reactive with radicals from the free radical initiator. The EPDM polymer also has residual carbon to carbon double bonds (unsaturation) reactive with free radicals from the initiator. Under harsher conditions (e.g. higher temperatures, more reactive free radicals, and/or higher concentrations of free radicals) the EPM polymer by itself is reactive with free radicals.

The functionalization reactions of EPM and EPDM polymers in solvents with free radicals and unsaturated molecules having functional groups is well known as seen in U.S. Pat. Nos. 4,340,689 and 5,384,371 hereby incorporated by reference. The reaction conditions are varied depending on many factors (including whether there is residual pendant unsaturation on the polymer chain) to optimize the percentage of functional groups chemically bonded as a function of the unsaturated molecules with functional groups physically reacted with the EPM and/or EPDM. The reaction conditions also are optimized to minimize crosslinking of the EPM or EPDM polymer and to minimize unwanted homopolymerization when the unsaturated molecules have functional groups capable of homopolymerization.

Depending on the functional group to be added to the polymer and the nature and amount of the polymerization catalyst system, it may be desirable to remove any residual inorganic polymerization catalysts from the polymer prior to functionalization. The process of removing inorganic catalysts is known as de-ashing the polymer and is well known to those who practice Ziegler-Natta or metallocene polymerizations. If the amount of inorganic polymerization catalyst to be removed by de-ashing is small and/or if their effect on final properties is inconsequential then de-ashing can be optional.

Desirably the unfunctionalized ethylene copolymer is functionalized before the residual polymerization solvent(s) are fully separated from the ethylene copolymer. Functionalizing prior to fully separating the copolymer from the solvents adds considerably to the commercial viability of the process. The presence of residual polymerization solvents decreases the viscosity of the copolymer containing phase of the solution, facilitating particle formation and the formation of small particles. Preferred residual polymerization solvents are straight chain saturated paraffins having from 5 to 8 carbon atoms and/or aromatic hydrocarbon having from 6 to 12 carbon atoms and a single aromatic nucleus such as benzene and toluene. The ethylene copolymer can be further diluted prior to or subsequent to functionalization. Dilution solvents may include the polymerization solvents and more polar compounds such as saturated halogenated compounds, alcohols, ketones aldehydes having low enough reactivity so they do not interfere with the graft reaction, with from 1,2 or 3 to about 5, 10 or 20 carbon atoms. Cyclic ethers such as tetrahydrofuran can also be used. The maximum concentration of the copolymer in the polymerization solvent depends on the maximum viscosity required for effective emulsification. Solvent and residual monomers can be partially stripped from the polymer and polymerization solvent. This stripping can be to modify viscosity or to remove monomer. The maximum viscosity at the shear rate and temperature of the emulsification step is desirably less than about 50 Pa·s as measured by Brookfield LVT viscometer at 25° C. using a number 3 spindle at 0.2 rev./s. It is more desirable to have the viscosity less than 10 Pa·s. Since the viscosity depends on molecular weight, MWD, and long chain branching, the maximum concentration of copolymer in the copolymer containing phase used in the process and subsequently in the emulsion can vary. The typical range of concentrations is from about 4 to 50 wt. % copolymer in the copolymer and its polymerization solvents when they are emulsified.

Desirable functional groups to be added onto the ethylene copolymer are selected from carboxyl group, anhydride group derived from the dehydration of two carboxyl groups, sulfonic group, pyrrolidone group, pyridine group, amine group and hydroxyl group or combinations thereof. More desirably the functional groups are carboxyl group, anhydride group and/or pyrrolidone group. Any groups that are polar in nature may be used in the practice of this invention provided that the concentration of the groups is such that the polymer is an elastomer and is not water soluble. Polar groups are generally defined as groups with one or more atoms other than carbon or hydrogen, such as nitrogen and oxygen. Relatively low concentrations of ionizable groups that are randomly attached along the polymer chain have been found to be effective. Such groups may be either acid (carboxyl, sulfonic) or basic (amine, pyrrolidone, pyridine). The functional groups are desirably present in an amount from about 0.005 to 0.2 moles per 100 grams of functionalized polymer.

The carboxyl groups are conveniently added by reacting an unsaturated monomer which includes at least one carboxylic acid group and/or an anhydride formed from dehrocondensation of two carboxylic acid groups with the ethylene copolymer. For illustration purposes the monomers, which include carboxylic acid groups or anhydride group, include but are not limited to

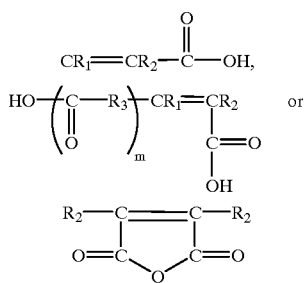

(generic formula) wherein $R_1$=H or an alkyl of 1 to 4 carbon atoms, each $R_2$ is independently H or an alkyl of 1 to 4 carbon atoms and $R_3$=is optionally absent when m=1 or is an alkyl of 1 to 5 carbon atoms, etc. and m=1 to 4. Desirably these monomers have from 3 to 20 carbon atoms, at least one carbon to carbon double bond, and one or more carboxylic acid group. Examples of monomers include acrylic acid, methacrylic acid, maleic acid, maleic anhydride. The functionalization can be effected by mixing the ethylene copolymer desirably in the solvent from its polymerization with the monomers to be grafted in the presence of a free radical source.

The free radical source can be organic peroxide, perbenzoate, hydroperoxide, an azo-initiator such as azobisisobutonitrile; UV activated initiator, electron beam, free radical generator or other conventional free radical sources. The free radical grafting of the monomers to the ethylene copolymer can occur over a broad temperature range such as below 0° C. to about 150° C. The free radical source chosen will have some effect on the temperature chosen or vice versa, as some free radical initiators decompose at effective rates to generate free radicals only at narrow temperature ranges e.g. a range of 20–50° C. where the generation of radicals is not too slow nor too fast. Depending on whether the ethylene copolymer has residual unsaturation and the extent of polymer chain scission that is tolerable, it may be desirable to exclude oxygen from the reactor as it can promote side reactions including chain scission. Some homopolymerization of the added monomer(s) can occur. This can be controlled somewhat by the ratio of ethylene copolymer to monomers and other reaction conditions, such as when the monomer is added. Some crosslinking of the ethylene copolymer may occur during the functionalization reaction. This can be minimized by minimizing the amount of residual unsaturation in the ethylene copolymer and other techniques which detract from chain coupling reactions.

The anhydride of two carboxyl groups are conveniently grafted on by reacting unsaturated anhydrides of di or polycarboxylic acid, for example maleic anhydride, onto the ethylene copolymer. Desirably the anhydrides have from 4 to about 20 carbon atoms, one or more carbon to carbon double bond, and one or more anhydride group. The amount of bound anhydride groups conditions are as previously given. U.S. Pat. Nos. 3,884,882 and 4,010,223 give conditions for grafting anhydrides onto bulk EPDM rubber. U.S. Pat. Nos. 4,340,689 and 5,384,371 provide additional details on grafting anhydrides onto EPM and EPDM in solutions and are hereby incorporated by reference. Subsequent to adding an anhydride to said ethylene copolymer, the anhydride group can be reacted with a monoamine molecule to form an amide or imide linkage, both of which are functional groups. Use of a polyamine reactant is set forth below.

The pyrrolidone groups are conveniently added by grafting vinyl pyrrolidone or mono or polyalkyl substituted vinyl pyrrolidone onto the ethylene copolymer. Said alkyl groups substituted on the vinyl pyrrolidone can have from 1 to 4 carbon atoms. U.S. Pat. No. 4,340,689 gives details and examples for grafting vinyl pyrrolidone onto EPM and EPDM rubbers in solutions. The amount of pyrrolidone groups and the reaction conditions are similar to those for grafting other unsaturated molecules with functional groups.

Hydroxyls could be added by grafting of epoxy groups onto the polymer as in U.S. Pat. No. 4,156,061 followed by hydrolysis. U.S. Pat. No. 4,156,061 is hereby incorporated by reference.

The amine groups can be conveniently added by first forming a functionalized ethylene copolymer with carboxyl groups and/or anhydrides of two carboxyl groups and then reacting that functionalized copolymer with an excess of a diamine or polyamine having from 1 to 16 or 20 carbon atoms and at least 2 primary and/or secondary amine groups.

The functionalized ethylene copolymer is a solution in its polymerization solvent or a portion thereof prior to emulsification. After functionalization the functional ethylene copolymer is desirably dispersed in water. An emulsifying agent(s), also known as a dispersant and/or surfactant, is used to facilitate forming a small diameter dispersed phase that resists agglomeration and/or coagulation. The solution of ethylene copolymer, either unfunctionalized or functionalized, will be referred to as cement. Typically the cement has a viscosity of less than 50 Pa·s measured with a Brookfield viscometer at the temperature used for emulsification. Additional solvent can be added to decrease viscosity facilitating the formation of small particles. Instructions for selecting appropriate emulsifiers are given in J. of Elastomers and Plastics, vol. 9, pp. 94–101 already incorporated by reference.

The cement, water and an emulsifier are mixed to form an emulsion. The ratio of emulsifier to ethylene copolymer is desirably from about 0.5 to about 15 parts by weight of emulsifier per 100 parts by weight ethylene copolymer and more desirably from about 1 or 2 to about 9 parts by weight. The amount of water is desirably from about 60 to about 400 parts by weight per 100 parts by weight ethylene copolymer and more desirably from about 80 to about 300 and preferably from about 100 to about 250.

The emulsion can be formed by use of various commercial mixing devices or homogenizers such as those that develop high shear rates either by passing the two phases through a small orifice at high pressure, impingment of multiple streams, or shearing one or both phase by using a serrated or erose surface optionally traveling at a high velocity (e.g. Cowles mixer). These devices are well known in the art for developing sufficiently high shear to form an emulsion. Ultrasonic devices may also be used to reduce the particle size. The latex can be refined (i.e. making a more uniform or smaller particle size distribution) by using higher shear rates. After sufficient particle size decrease and particle size distribution control has been achieved, the residual solvent and optional monomer(s) can be removed by distillation (e.g. steam and/or vacuum) to produce the finished latex. Alternatively, a Feed Injection Device (FID) as disclosed by Burton and O'Farrell in J. of Elastomers and Plastics, vol. 9, pp. 94–101 can be used to remove residual solvents and or monomers. If desired some of the water can be evaporated to increase the solids content of the latex. Examples of emulsifying cements are in U.S. Pat. No. 5,574,091 example 1 and descriptions are given in U.S. Pat. No. 4,007,149, column 5, line 20–58.

The functionalized ethylene copolymer latexes of this specification have use in a variety of applications which previously used natural latexes or synthetic latexes such as styrene-butadiene latexes. Specifically, the functionalized ethylene copolymer latex would be useful as a binder in a paper coating, in that the residual unsaturation (associated with yellowing in paper coatings) could be reduced by using a EPM or EPDM copolymer. Desirably the ethylene copolymer used in paper coatings would have low amounts or be free of residual unsaturation derived from nonconjugated diene monomers.

The functionalized ethylene copolymer latex would be useful as a binder or binder modifier in adhesives, particularly water based adhesives and pressure sensitive adhesives. For adhesion applications an ethylene copolymer with residual unsaturation derived from nonconjugated dienes would generally be useful. The latex could be used to make laminates comprising a first and second substrate and the reaction product of a water-based adhesive including functionalized ethylene copolymer latex.

The functionalized ethylene copolymer latex would be useful to form goods formed from latexes such as dipped latex goods (e.g. balloons, gloves, etc). It could also be used as the primary latex or as one of the latexes in coatings such as roof coatings and coatings for concrete and other porous building materials and membranes such as roofing membranes.

The functionalized ethylene copolymer latex would be useful as a rubbery core material in a core/shell impact modifier for plastics. The use of individual particles from the latex as the individual core would provide fairly precise control over the size (diameter) of the cores as compared to cores prepared by dispersing bulk rubber in a plastic. The functional groups on the ethylene copolymer would facilitate coating the core with a thermoplastic shell uniform in thickness and uniform in coverage on the core. The functional group may also facilitate transfer of stress and strain between the core and shell materials of the core shell impact modifier. Desirably the core material (functionalized ethylene copolymer) would be from about 5 to about 80 wt. % of the impact modifier. Desirably the shell material would be from about 20 to about 95 wt. % of the impact modifier. Desirably the shell would comprise from about 50 to about 100 wt. % repeat units from vinyl aromatic monomers having from 8 to 10 carbon atoms, alkyl methacrylate monomers having from 5 to 8 carbon atoms or alkyl or unsubstituted acrylonitrile having from 3 to 5 carbon atoms or combinations thereof. The residual optional 0–50 wt. % of the shell could be copolymerizable unsaturated monomers. The shells could optionally be prepared by polymerizing monomers onto the emulsified ethylene copolymer latex.

EXAMPLES

Example 1

Solution polymerizations are carried out in a continuous flow stirred tank reactor in the manner shown in the chart below to produce EPM and EPDM polymers in their polymerization solvents.

| Example | Run A | Run B | Run C |
|---|---|---|---|
| Residence time, min. | 17 | 15 | 13 |
| Temperature | 27 | 27 | 27 |
| Pressure, Kpa | 413 | 413 | 413 |
| Total hexane feed, kg/h | 7.5 | 24.2 | 31.6 |

-continued

| Example | Run A | Run B | Run C |
|---|---|---|---|
| ethylene, kg/100 kg hexane | 3.4 | 3.86 | 3.4 |
| propylene, kg/100 kg hexane | 11.0 | 12.0 | 6.8 |
| ethylidene norbornene, kg/100 kg hexane | — | 0.65 | 0.65 |
| $VOCl_3$m mole/h | 2.07 | 3.4 | 3.4 |
| $Al_2Et_3Cl_3$m mole/h | 12.4 | 15.0 | 15.0 |
| $NH_3$ to V mole ratio | 0 | 1.5 | 1.5 |
| Hydrogen, ppm on ethylene | 400 | 400 | 400 |
| Polymer Analysis | | | |
| Wt. % ethylene | 46 | 44 | 65 |
| Wt. % ethylidene norbornene | — | 3.5 | 3.6 |
| Mn | 20,000 | 18,000 | 21,000 |
| Wt. % crystallinity | 0 | 0 | 13.2 |
| Viscosity of reactor cement at 25 C., Pa·s | less than 10 | less than 10 | less than 10 |

Portions of the above unfunctionalized reactor cements from polymerization runs A, B, and C are emulsified with water using a Gifford-Woods Homogenizer by mixing at about 8–10,000 rpm for 12 min. at 35° C. About 50 parts of water are used to 100 parts of cement. About 5 parts of Rhodapex CO 436 surfactant (from Rhone Poulenc, a sulfonated anionic) is used per 100 parts of EPM or EPDM in the cement. A 0.1 wt. % defoaming agent is added. Unreacted monomers, hexane and a fraction of the water are removed by rotary evaporation at 85° C. to yield a latex with about 35 wt. % solids for each example. The latexes are stable for over two months and the average particle size is about 1 micron.

Functionalized EPM and EPDM are prepared as follows. Portions each of the original unfunctionalized reactor cements shown in the chart above are subjected to reduced pressure sufficient to remove unreacted ethylene and propylene. The cements are grafted with maleic anhydride to give polymers with about 50 millimoles of maleic anhydride per 100 g of polymer. The functionalization, for example grafting procedure, is similar to U.S. Pat. No. 4,340,689 Example 3, column 6 line 27 through column 7 line 5, where the grafting of N-vinyl pyrrolidone to EPDM or EPM is taught. The teachings of U.S. Pat. No. 4,340,689 with respect to grafting reactions and conditions is hereby incorporated by reference. The grafted cements are then emulsified with water in the same manner as described immediately above for the unfunctionalized reactor cements except that 3 parts of surfactant are used per 100 parts of EPM or EPDM. Polymerization solvent and water are removed to yield a latex with about 35 wt. % solids for each example. The latexes are stable for over four months and the average particle size is about 0.8 microns. The latexes have no apparent gel.

While in accordance with the patent statutes the best mode and preferred embodiment has been set forth, the scope of the invention is not limited thereto, but rather by the scope of the attached claims.

What is claimed is:

1. A process for preparing a functionalized olefin copolymer latex directly from the olefin copolymer solvent solution in which said olefin copolymer was produced, comprising the steps of:

a) providing an olefin copolymer in an organic solvent solution derived from monomers polymerized in said organic solvent, said copolymer having at least 85 weight percent repeat units derived from at least two different alpha-monoolefin monomers having from 2 to 8 carbon atoms;

b) subsequently functionalizing said olefin copolymer contained in said organic solvent with from about 0.005 to about 0.2 moles of a polar group per 100 grams of said copolymer;

c) dispersing said functionalized olefin copolymer organic solvent solution in water with a surfactant using high shear mixing to form an emulsion; and d) subsequently removing in excess of 90 weight percent of said organic solvent to produce a latex containing said functionalized olefin copolymer.

2. A process for preparing a functionalized olefin copolymer latex directly from the olefin copolymer solvent solution in which said olefin copolymer was produced, comprising the steps of:

a) providing an olefin copolymer in an organic solvent solution derived from monomers polymerized in said organic solvent, said copolymer having at least 85 weight percent repeat units derived from at least two different alpha-monoolefin monomers having from 2 to 8 carbon atoms;

b) subsequently functionalizing said olefin copolymer contained in said organic solvent with from about 0.005 to about 0.2 moles of a polar group per 100 grams of said copolymer, said functional group being a carboxyl group, an anhydride group of polycarboxylic acid, a pyrrolidone group, a pyridine group, an amine group, or a hydroxyl group, or combinations thereof;

c) dispersing said functionalized olefin copolymer organic solvent solution in water with a surfactant and forming an emulsion using high shear mixing, and d) subsequently removing in excess of 90 weight percent of said organic solvent to produce a latex containing said functionalized olefin copolymer.

3. The process according to claim 2, wherein said functional group is carboxylic acid group, an anhydride group derived from a polycarboxylic acid, or a pyrrolidone group, or combinations thereof.

4. The process according to claim 3, wherein said olefin copolymer is functionalized by grafting an unsaturated molecule having a functional group thereon to said olefin copolymer.

5. The process according to claim 4, wherein said grafting is accomplished using a free radical source.

6. A process according to claim 3, wherein said olefin copolymer is essentially free of repeat units from a polyunsaturated monomer.

7. A process according to claim wherein said olefin copolymer is an ethylene-propylene copolymer (EPM).

8. The process according to claim 3, wherein said olefin copolymer includes repeat units from a polyunsaturated monomer.

9. The process according to claim 8, wherein said olefin copolymer is an ethylene-propylene-diene copolymer (EPDM).

10. The process according to claim 2, wherein said olefin copolymer comprises from about 20 to about 80 weight percent repeat units derived from ethylene and from about 20 to about 80 weight percent repeat units derived from an alpha-monoolefin having from 3 to 8 carbon atoms.

11. The process according to claim 10, wherein functionalizing said olefin copolymer is accomplished by grafting maleic anhydride or vinyl pyrrolidone to said olefin copolymer.

12. The process according to claim 11, wherein said functional groups are present in an amount of from about 0.01 to about 0.2 moles per 100 grams of said olefin copolymer, and wherein the average particle diameter of said latex is from about 0.2 to about 20 microns.

* * * * *